US008561072B2

(12) United States Patent
Ringseth et al.

(10) Patent No.: US 8,561,072 B2
(45) Date of Patent: Oct. 15, 2013

(54) SCHEDULING COLLECTIONS IN A SCHEDULER (75) Inventors: Paul F. Ringseth, Bellevue, WA (US); Genevieve Fernandes, Redmond, WA (US); Niklas Gustafsson, Bellevue, WA (US); Rick Molloy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 12/121,794

(22) Filed: May 16, 2008

(65) Prior Publication Data
US 2009/0288087 A1 Nov. 19, 2009

(51) Int. Cl.
G06F 9/46 (2006.01)
G06F 9/06 (2006.01)
G06F 13/00 (2006.01)

(52) U.S. Cl.
USPC ......................................................... 718/102

(58) Field of Classification Search
None
See application file for complete search history.

(56) References Cited

U.S. PATENT DOCUMENTS

| | | | | |
|---|---|---|---|---|
| 5,349,656 A | * | 9/1994 | Kaneko et al. | 718/102 |
| 5,586,289 A | * | 12/1996 | Chin et al. | 711/111 |
| 5,692,193 A | * | 11/1997 | Jagannathan et al. | 718/106 |
| 6,105,053 A | * | 8/2000 | Kimmel et al. | 718/105 |
| 6,442,585 B1 | | 8/2002 | Dean et al. | |
| 6,901,507 B2 | | 5/2005 | Wishneusky | |
| 6,952,827 B1 | * | 10/2005 | Alverson et al. | 718/104 |
| 7,321,940 B1 | | 1/2008 | Smith et al. | |
| 7,886,283 B2 | * | 2/2011 | Nacul et al. | 717/137 |
| 2002/0001344 A1 | | 1/2002 | Morris et al. | |
| 2002/0069328 A1 | * | 6/2002 | Chauvel | 711/130 |
| 2003/0037091 A1 | * | 2/2003 | Nishimura et al. | 709/103 |
| 2003/0097548 A1 | | 5/2003 | Wishneusky | |
| 2003/0177288 A1 | | 9/2003 | Kunimatsu et al. | |
| 2004/0064816 A1 | * | 4/2004 | Alverson et al. | 718/102 |
| 2004/0154021 A1 | * | 8/2004 | Sangili | 719/310 |
| 2005/0108711 A1 | * | 5/2005 | Arnold et al. | 718/100 |
| 2005/0125629 A1 | * | 6/2005 | Kissell | 712/1 |
| 2005/0149916 A1 | | 7/2005 | Shpeisman et al. | |
| 2005/0149936 A1 | | 7/2005 | Pilkington | |
| 2006/0004942 A1 | * | 1/2006 | Hetherington et al. | 711/3 |
| 2006/0123420 A1 | * | 6/2006 | Nishikawa | 718/104 |
| 2006/0130062 A1 | * | 6/2006 | Burdick et al. | 718/100 |

(Continued)

FOREIGN PATENT DOCUMENTS

JP 01-316830 12/1989
JP 10-078942 3/1998

(Continued)

OTHER PUBLICATIONS

Boris Weissman, "Active Threads: an Extensible and Portable Light-Weight Thread System", TR-97-036, Sep. 1997. International Computer Science Institute, Berkeley California.*

(Continued)

Primary Examiner — Eric Coleman (57) ABSTRACT

A scheduler in a process of a computer system includes a respective scheduling collection for each scheduling node in the scheduler. The scheduling collections are mapped into at least a partial search order based on one or more execution metrics. When a processing resource in a scheduling node becomes available, the processing resource first attempts to locate a task to execute in a scheduling collection corresponding to the scheduling node before searching other scheduling collections in an order specified by the search order.

18 Claims, 5 Drawing Sheets

(56) References Cited

U.S. PATENT DOCUMENTS

| | | | |
|---|---|---|---|
| 2006/0161924 A1 | 7/2006 | Di Gregorio | |
| 2006/0168214 A1* | 7/2006 | Armstrong et al. | 709/225 |
| 2006/0206692 A1 | 9/2006 | Jensen | |
| 2006/0277551 A1* | 12/2006 | Accapadi et al. | 718/107 |
| 2007/0073857 A1* | 3/2007 | Chang et al. | 709/223 |
| 2007/0204268 A1* | 8/2007 | Drepper | 718/102 |
| 2007/0220517 A1 | 9/2007 | Lippett | |
| 2008/0066072 A1* | 3/2008 | Yurekli et al. | 718/104 |
| 2008/0148291 A1* | 6/2008 | Huang et al. | 719/320 |
| 2008/0189709 A1* | 8/2008 | Amin | 718/102 |
| 2009/0055829 A1* | 2/2009 | Gibson | 718/103 |

FOREIGN PATENT DOCUMENTS

| | | |
|---|---|---|
| JP | 11-259318 | 9/1999 |
| KR | 10-0538727 | 12/2005 |
| KR | 10-2007-0090649 | 9/2007 |
| WO | 0201344 | 1/2002 |

OTHER PUBLICATIONS

A PCT Search Report for Application No. PCT/US2009/038658 mailed on Oct. 28, 2009 (11 pages).
Chinese Office Action for Application No. 200980118323.8 mailed Aug. 28, 2012 (9 pages).
International Preliminary Report on Patentability for International Application No. PCT/US2009/038658 mailed Nov. 25, 2010 (6 pages).
AAS, "Understanding the Linux 2.6.8.1 CPU Scheduler", Silicon Graphics, Inc. (SGI), Copyright 2005, Dated: Feb. 17, 2005, pp. 1-38.
Regehr, "Using Hierarchical Scheduling to Support Soft Real-Time Applications in General-Purpose Operating Systems", Presented to the faculty of the School of Engineering and Applied Science, University of Virginia Charlottesville, VA, USA, Dated: May 2001, 181 pages.
Chandra, et al., "Hierarchical Scheduling for Symmetric Multiprocessors", IEEE Transactions on Parallel and Distributed Systems, Dated: Jul. 10, 2007, pp. 1-30.
Notice of Rejection for Japanese Patent Application No. 2011-509509 mailed May 7, 2013 (3 pages) (English Translation).

* cited by examiner

| LEVEL 0 NODES / COLLECTION SUBSETS | HARDWARE THREADS | LEVEL 1 NODES / COLLECTION SUBSETS | LEVEL 2 NODES / COLLECTION SUBSETS |
|---|---|---|---|
| 30(1) / 40(1) | 16(1)-16(4) | 30(2), 30(3) / 40(2), 40(3) | 30(4) / 40(4) |
| 30(2) / 40(2) | 16(5)-16(8) | 30(1), 30(4) / 40(1), 40(4) | 30(3) / 40(3) |
| 30(3) / 40(3) | 16(9)-16(12) | 30(1), 30(4) / 40(1), 40(4) | 30(2) / 40(2) |
| 30(4) / 40(4) | 16(13)-16(16) | 30(2), 30(3) / 40(2), 40(3) | 30(1) / 40(1) |

SCHEDULING COLLECTIONS IN A SCHEDULER

BACKGROUND

Processes executed in a computer system may include task schedulers that schedule tasks of the processes for execution in the computer system. These schedulers may operate with various algorithms that determine how tasks of a process are to be executed. In a computer system with multiple processing resources, the processing resources may contend with one another in searching for tasks to execute in a scheduler. The contention tends to reduce the efficiency of the computer system in executing a process with a scheduler, and the amount of contention typically increases as the number of processing resources increases in the computer system. As a result, the contention of processing resources may limit the scalability of the scheduler as the number of processing resources in a computer system increases.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system includes a respective scheduling collection for each scheduling node in the scheduler. The scheduler populates each scheduling collection with a set of schedule groups where each include schedule group includes a set of tasks of the process. The scheduling collections are mapped into at least a partial search order based on one or more execution metrics. When a processing resource in a scheduling node becomes available, the processing resource attempts to locate a task to execute in a scheduling collection corresponding to the scheduling node. If the processing resource does not locate a task to execute in the scheduling collection, the processing resource attempts to locate a task to execute in other scheduling collections in an order specified by the search order.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
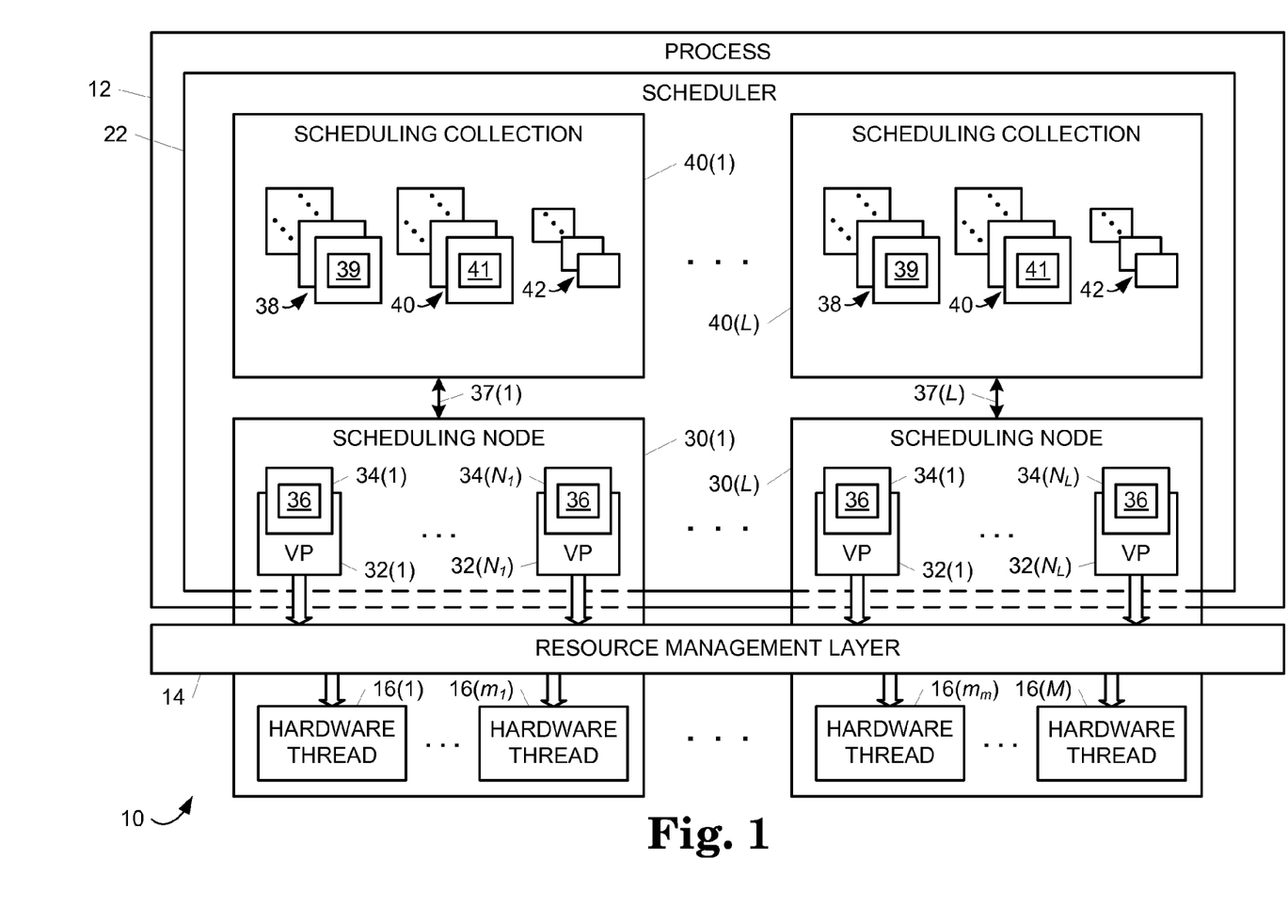
FIG. 1 is a block diagram illustrating an embodiment of a scheduler with scheduling collections in a runtime environment.

FIG. 1 is a block diagram illustrating an embodiment of an execution context scheduler 22 in a process 12 of a runtime environment 10. Scheduler 22 includes a set of scheduling collections 40(1)-40(L), where L is an integer greater than or equal to two and denotes the Lth scheduling collection 40. Each scheduling collection 40(1)-40(L) corresponds to a respective scheduling node 30(1)-30(L).

Runtime environment 10 represents a runtime mode of operation in a computer system, such as embodiments 100A and 100B of a computer system 100 shown in FIGS. 6A and 6B and described in additional detail below, where the computer system is executing instructions. The computer system generates runtime environment 10 from a runtime platform such as a runtime platform 122 shown in FIG. 6A and described in additional detail below.

Runtime environment 10 includes an least one invoked process 12, a resource management layer 14 and a set of hardware threads 16(1)-16(M), where M is an integer that is greater than or equal to two and denotes the Mth hardware thread 16. Runtime environment 10 allows tasks from process 12 to be executed, along with tasks from any other processes that co-exist with process 12 (not shown), using resource management layer 14 and hardware threads 16(1)-16(M). Runtime environment 10 operates in conjunction with resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads). Process 12 obtains access to the processing and other resources in the computer system (e.g., hardware threads 16(1)-16(M)) from resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from an operating system of the computer system (not shown in FIG. 1) in the embodiment of FIG. 1. In other embodiments, resource management layer 14 or some or all of the functions thereof may be included in the operating system.

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specifies a policy for scheduler 22.

Scheduler 22 interacts with resource management layer 14 to negotiate resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

Runtime environment 10 creates scheduler 22 with knowledge of the underlying topology of the computer system. Runtime environment 10 provides resource management layer 14 and/or scheduler 22 with node information of the computer system. The node information identifies hardware nodes of the computer system directly or includes sufficient information about the topology of the computer system to allow resource management layer 14 and/or scheduler 22 to partition hardware resources into scheduling nodes 30 based on one or more execution metrics. The execution metrics may include a speed, type, and/or configuration of processing resources (e.g., hardware threads 16), memory resources, and/or other resources of the computer system.

For example, in embodiments where the topology of the computer system includes a cache coherent non-uniform memory access (NUMA) architecture, the node information may identify a set of two or more NUMA nodes where each NUMA node includes a set of hardware threads 16 and a local memory. The node information may also include information that describes memory accesses between NUMA nodes (e.g., NUMA distances or memory access topologies or times).

In another example, the node information may describe the speed, type, and/or configuration of processing resources (e.g., hardware threads 16) to allow the processing resources to be grouped based on similarities or differences between the characteristics of the processing resources. These characteristics may include the type of instruction set of one or more of the processing resources to allow different nodes to be formed with sets of processing resources that have different types of instruction sets.

Runtime environment 10 causes scheduler 22 to include a set of two or more scheduling nodes 30(1)-30(L) based on the node information. Each scheduling node 30 includes allocated processing resources in the form of virtual processors 32 and hardware threads 16. Scheduling node 30(1) includes virtual processors $30(1)$-$30(N_1)$ which map to hardware threads $16(1)$-$16(m_1)$ where $N_1$ is an integer that is greater than or equal to one and denotes the $(N_1)$th virtual processor 30 and $m_1$ is less than or equal to M and denotes the $(m_1)$th hardware thread 16. Scheduling node 30(L) includes virtual processors $30(1)$-$30(N_L)$ which map to hardware threads $16(m_m)$-$16(M)$ where $N_L$ is an integer that is greater than or equal to one and denotes the $(N_L)$th virtual processor 30 and $m_m$ is less than or equal to M, greater than $m_1$, and denotes the $(m_m)$th hardware thread 16.

Scheduler 22 creates a scheduling collection 40 for each scheduling node 30. Accordingly, scheduling collections 40(1)-40(L) to correspond to respective scheduling nodes 30(1)-30(L) as indicated by arrows 37(1)-37(L). Scheduler 22 maps scheduling collections 40 into a full or a partial search order based on one or more execution metrics and uses the search order to search for tasks to execute when processing resources become available as will be described in additional detail below.

The set of execution contexts in scheduler 22 includes a set of execution contexts 34 with respective, associated tasks 36 that are being executed by respective virtual processors 32 in each scheduling node 30 and, in each scheduling collection 40, a set of zero or more runnable execution contexts 38 and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 40 by generating data, a message, or an event that will be used by another execution context 40.

Figure 5A:
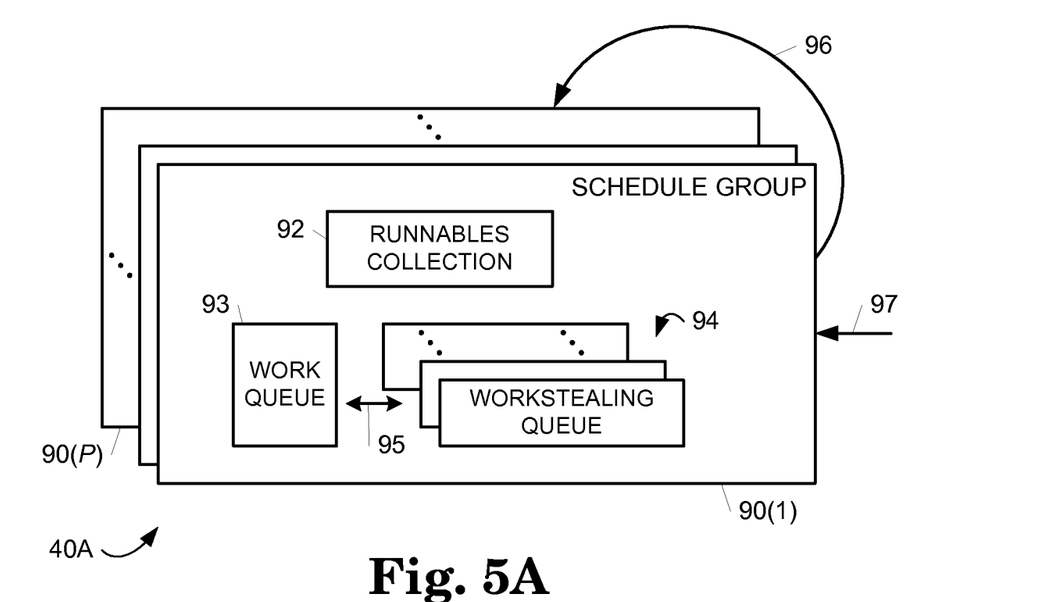
FIGS. 5A-5B are block diagrams illustrating embodiments of scheduling collections.

Each task in scheduler 22 may be realized (e.g., realized tasks 36 and 39), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Each scheduling collection 40 in scheduler 22 may be organized into one or more synchronized collections (e.g., a stack and/or a queue) for logically independent tasks with execution contexts (i.e., realized tasks) along with a list of workstealing queues for dependent tasks (i.e., unrealized tasks) as illustrated in the embodiment of FIG. 5A described below.

Upon completion, blocking, or other interruption (e.g., explicit yielding or forced preemption) of an execution context 34 running on a virtual processor 32, the virtual processor 32 becomes available to execute another realized task 39 or unrealized task 42. Scheduler 22 searches for a runnable execution context 38 or an unrealized task 42 to attach to the available virtual processor 32 for execution. Scheduler 22 continues attaching execution contexts 38 to available virtual processors 32 for execution until all execution contexts 38 of scheduler 22 have been executed.

When a virtual processor 32 in a scheduling node 30 becomes available, the virtual processor 32 attempts to locate a task to execute in a scheduling collection 40 corresponding to the scheduling node 30. If the virtual processor 32 does not locate a task to execute in the scheduling collection 40, the virtual processor 32 attempts to locate a task to execute in other scheduling collections 40 in an order specified by the search order. In one embodiment, scheduler 22 may include a configurable delay parameter that causes available virtual processors 32 to delay the search of other scheduling collections 40 to attempt to minimize contention with other available virtual processors 32. The delay parameter may also be used to prioritize the search for work to the scheduling collection 40 corresponding to the scheduling node 30 of the available virtual processor 32.

Figure 2:
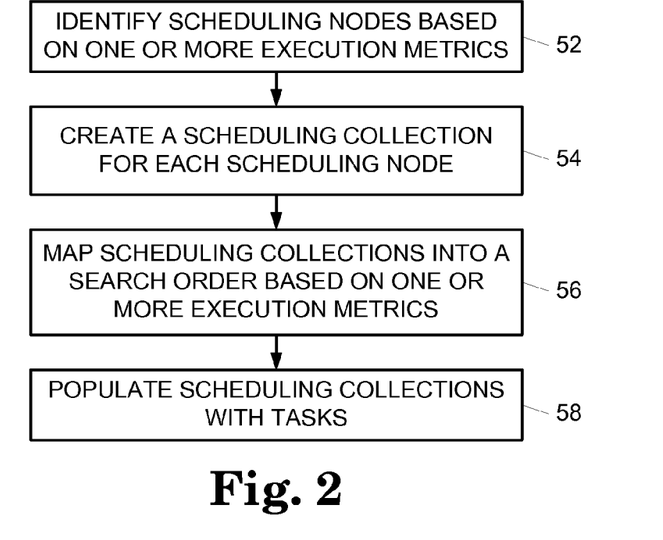
FIG. 2 is a flow chart illustrating an embodiment of a method for creating and populating scheduling collections in a scheduler.

FIG. 2 is a flow chart illustrating an embodiment of a method for creating and populating scheduling collections 40 in scheduler 22. The method of FIG. 2 will be described with reference to the embodiment of scheduler 22 in FIG. 1.

In FIG. 2, runtime environment 10, and/or resources management layer 14 identify scheduling nodes 30 based on one or more execution metrics as indicated in a block 52. The execution metrics may be any suitable measures of executing instructions in the computer system and may include processing speed, processing throughput, and memory latency characteristics of processing and other resources in the computer system. Using execution metrics determined for various sets of components of the computer system, runtime environment 10, and/or resources management layer 14 partition the processing and other resources of the computer system and use the partitions to identify scheduling nodes 30 for scheduler 22. Scheduling nodes 30 each include groups of similar or dissimilar sets of processing and other resources of the computer system.

In one example, the computer system may include processors that include multiple hardware threads 16. In this example, runtime environment 10, and/or resources management layer 14 may partition each processor package into separate node and create a scheduling node 30 for each node.

In another example, in a NUMA system, the difference in memory latencies between processors and different portions of a memory may be used as execution metrics to divide the computer system into NUMA nodes and create a scheduling node 30 for each NUMA node. The NUMA nodes may each have a set of processing resources and a local memory where the access to the local memory by processing resources within a NUMA node is faster than access to a local memory in another NUMA node by the processing resources.

In a further example, runtime environment 10, and/or resources management layer 14 may partition arbitrary or partially arbitrary sets of processor resources in a computer system into nodes and create a scheduling node 30 for each node.

In yet another example, runtime environment 10, and/or resources management layer 14 may partition processing resources of different types or speeds into nodes where each node includes a number of the same type or speed of processing resource. Runtime environment 10, and/or resources management layer 14 create a scheduling node 30 for each node.

Runtime environment 10, resources management layer 14, and/or scheduler 22 create a respective scheduling collection 40 for each scheduling node 30 as indicated in a block 54. As shown in FIG. 1, scheduler 22 creates scheduling collections 40(1)-40(L) that correspond to respective scheduling nodes 30(1)-30(L). Each scheduling collection 40 forms a data structure in the memory of the computer system for storing tasks where the data structure is searchable by virtual processors 32 from a corresponding scheduling node 30 and virtual processors 32 from other scheduling nodes 30.

Runtime environment 10, resources management layer 14, and/or scheduler 22 map scheduling collections 40(1)-40(L) into a full or partial search order based on one or more execution metrics as indicated in a block 56. Scheduler 22 uses the execution metrics to compare execution costs between different scheduling nodes 30. The execution costs may be described in terms of node distances where different node distances express different execution characteristics between a given scheduling node 30 and other scheduling nodes 30. With node distances, scheduling nodes 30 with lower execution costs relative to a given scheduling node 30 are described as being closer to the given scheduling node 30 and scheduling nodes 30 with higher execution costs relative to the given scheduling node 30 are described as being farther from the given scheduling node 30. Scheduler 22 maps scheduling collections 40(1)-40(L) into the full or partial search order using the node distances in one embodiment.

To create the search order, scheduler 22 groups the set of scheduling collections 40 into subsets of one or more scheduling collections 40 based on the node distances. Each scheduling collection 40 has a node distance of zero from a corresponding scheduling node 30. Accordingly, each scheduling collection 40 forms the first level subset of scheduling collections 40 (e.g., a level 0 subset) for the corresponding scheduling node 30. For the next level subset of scheduling collections 40 (e.g., a level 1 subset), scheduler 22 groups the set of one or more scheduling collections 40 with a closest range of node distances from the given scheduling node 30. Scheduler 22 then groups the set of one or more scheduling collections 40 with a next closest range of node distances from the given scheduling node 30 into the next level subset of scheduling collections 40 (e.g., a level 2 subset). Scheduler 22 continues grouping sets of one or more scheduling collections 40 with successive ranges of node distances from the given scheduling node 30 into successive level subsets of scheduling collections 40 until all desired scheduling collections 40 in the set of scheduling collections 40 have been incorporated into the search order.

The search order of scheduling collections 40 is used by available processing resources (i.e., virtual processors 32) in scheduling nodes 30 to search for tasks to execute. The search order may specify a partial search order by grouping more than one scheduling collections 40 in at least some of the subsets (e.g., a subset of two or more scheduling collections 40 that correspond to a subset of scheduling nodes 30 that have the same node distance or similar node distances from the given scheduling node 30). Where a partial order is specified, a processing resource may search the subset of scheduling collections 40 in a round robin or other suitable order. The search order may also specify a full search order by either grouping only one scheduling collection 40 in each subset or specifying a search order of each subset of two or more scheduling collections 40.

Figure 3A:
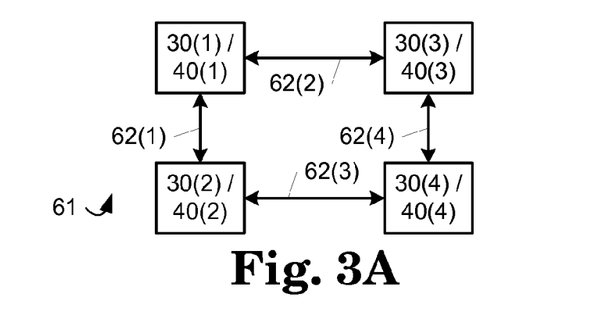
FIGS. 3A-3B are a diagram and a table illustrating an embodiment of a mapping of scheduling collections.
Figure 3B:
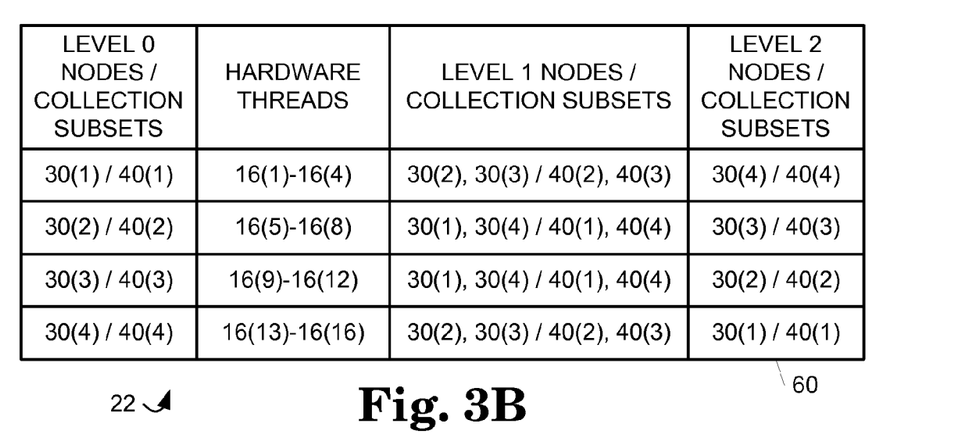

FIGS. 3A-3B are a diagram and a table, respectively, illustrating an embodiment of a partial search order 60 in a NUMA computer system 61 with four processor packages that include respective sets of four hardware threads 16. A respective local memory connects to each processor (not shown). Because each hardware thread 16 in a processor package has similar execution metrics, each processor package forms a level 0 node in the example of FIGS. 3A-3B. Accordingly, level 0 scheduling node 30(1) includes hardware threads 16(1)-16(4), level 0 scheduling node 30(2) includes hardware threads 16(5)-16(8), level 0 scheduling node 30(3) includes hardware threads 16(9)-16(12), and level 0 scheduling node 30(4) includes hardware threads 16(9)-16(12). Level 0 scheduling nodes 30(1)-30(4) correspond to respective level 0 subsets of scheduling collections 40(1)-40(4).

As shown in FIG. 3A, scheduling nodes 30(1)-30(2) share an interconnection 62(1) between nodes 30(1)-30(2), scheduling nodes 30(1)-30(3) share an interconnection 62(2) between nodes 30(1)-30(3), scheduling nodes 30(2)-30(4) share an interconnection 62(3) between nodes 30(2)-30(4), and scheduling nodes 30(3)-30(4) share an interconnection 62(4) between nodes 30(3)-30(4). Interconnections 62(1)-62(4) are all assumed to have the same speed and bandwidth characteristics in the example of FIG. 3A The node distances between any two nodes 30 that share an interconnection 62 is less than the node distances between any two nodes 30 that do not share an interconnection 62. For example, node 30(1) accesses node 30(4) using either both interconnections 62(1) and 62(3) or both interconnections 62(2) and 62(4). Similarly, node 30(2) accesses node 30(3) using either both interconnections 62(1) and 62(2) or both interconnections 62(3) and 62(4).

From node 30(1), the level 1 subset of scheduling collections 40 includes scheduling collections 40(2)-40(3) which correspond to scheduling nodes 30(2)-30(3) and the level 2 subset of scheduling collections 40 includes scheduling collection 40(4) which corresponds to to scheduling node 30(4).

From node 30(2), the level 1 subset of scheduling collections 40 includes scheduling collections 40(1)-40(4) which correspond to scheduling nodes 30(1)-30(4) and the level 2 subset of scheduling collections 40 includes scheduling collection 40(3) which corresponds to to scheduling node 30(3).

From node 30(3), the level 1 subset of scheduling collections 40 includes scheduling collections 40(1)-40(4) which correspond to scheduling nodes 30(1)-30(34) and the level 2 subset of scheduling collections 40 includes scheduling collection 40(2) which corresponds to to scheduling node 30(2).

From node 30(4), the level 1 subset of scheduling collections 40 includes scheduling collections 40(2)-40(3) which correspond to scheduling nodes 30(2)-30(3) and the level 2 subset of scheduling collections 40 includes scheduling collection 40(1) which corresponds to to scheduling node 30(1).

Referring back to FIG. 2, scheduler 22 populates scheduling collections 40(1)-40(M) with respective sets of tasks as indicated in a block 58. Each set of one or more tasks presented to scheduler 22 may be created explicitly by process 12 or implicitly by runtime environment 10 (e.g., by creating an agent without a parent or inducting an operating system execution context into an execution context of scheduler 22). Scheduler 22 inserts the sets of tasks into scheduling collections 40 according to any suitable algorithm or according to the topology of scheduling nodes 30. For example, scheduler 22 may insert sets of tasks into scheduling collections 40 in a round-robin order. As another example, scheduler 22 may insert sets of tasks into scheduling collections corresponding to desired topologies of scheduling nodes 30.

Figure 4:
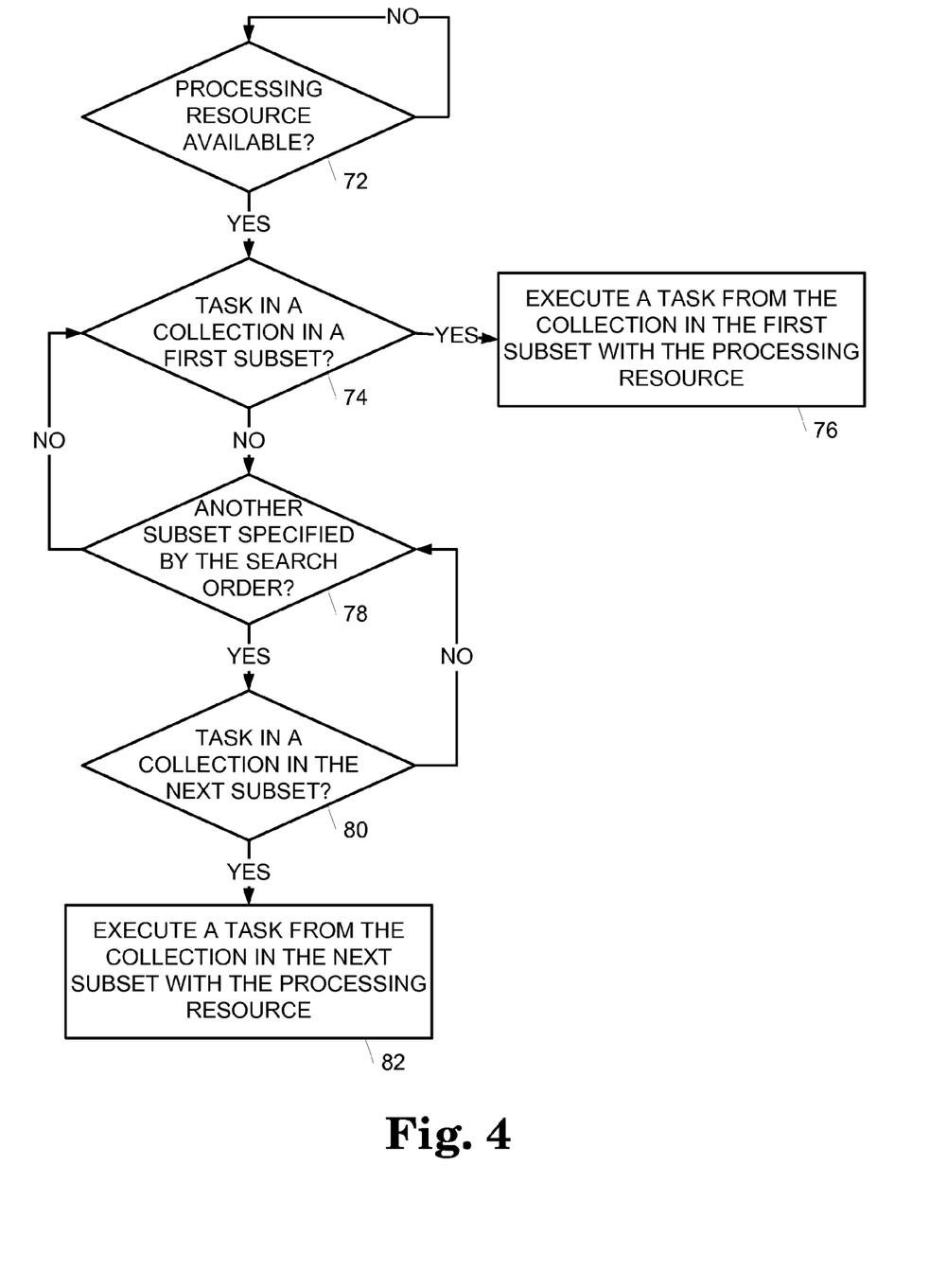
FIG. 4 is a flow chart illustrating an embodiment of a method for selecting tasks for execution.

FIG. 4 is a flow chart illustrating an embodiment of a method for selecting tasks for execution. The method of FIG. 4 will be described with reference to the embodiment of scheduler 22 in FIG. 1.

Scheduler 22 determines whether a virtual processor 32 becomes available as indicated in a block 72. Scheduler 22 may perform this function continuously while causing process 12 to be executed. Upon completion, blocking, or other interruption (e.g., explicit yielding or forced preemption) of an execution context 34 running on a virtual processor 32, the virtual processor 32 becomes available to execute a new task.

When scheduler 22 determines that a virtual processor 32 becomes available, scheduler 22 begins a search for a task for the available virtual processor 32 to execute. Scheduler 22 first attempts to locate a task to execute in a first subset of scheduling collections 40 as indicated in a block 74. The first subset of scheduling collections 40 is the scheduling collection 40 corresponding to the scheduling node 30 that includes the available virtual processor 32. Scheduler 22 may search the first subset in any suitable way.

If an executable task is found in the first subset, then scheduler 22 causes the task to be executed by the virtual processor 32 as indicated in a block 76. Virtual processor 32 attempts to execute the task as a continuation of a previous execution context 34. If virtual processor 32 is unable to execute the task as a continuation, then virtual processor 32 performs a full operating system context switch to the execution context represented by the task.

If an executable task is not found in the first subset, then scheduler 22 determines whether another subset of scheduling collections 40 is specified by the search order as indicated in a block 78. If the first level subset is the only subset specified by the search order, then scheduler 22 continues to search the first subset until an executable task is located.

If another subset is specified by the search order, then scheduler 22 attempts to locate a task to execute in one or more scheduling collections 40 in the next subset as indicated in a block 80. If an executable task is found in a scheduling collection 40 in the next subset, then scheduler 22 causes the task to be executed by the virtual processor 32 as indicated in a block 82. If an executable task is not found in the next subset of scheduling collections 40, then scheduler 22 repeats the function of block 78. Scheduler 22 continues to search subsets of scheduling collections 40 in the specified search order until either an executable task is found or all subsets specified by the search order have been searched.

In the above embodiments, scheduler 22 may be configured to search one or more of the above subsets of scheduling collections 40 repeatedly before moving on to the next subset. Scheduler 22 may also be configured to delay the search of one or more of the subsets in accordance with one or more delay parameters.

In the above embodiments, scheduling nodes 30 effectively own corresponding scheduling collections 40. At some point in the execution of process 12, all processing resources of a given scheduling node 30 may be executing tasks from scheduling collections 40 other than the scheduling collection 40 that corresponds to the given scheduling node 30. In this scenario, the owned scheduling collection 40 of the given scheduling node 30 becomes the scheduling collection 40 from which the most processing resources of the given scheduling node 30 are executing tasks and the given scheduling node 30 becomes a rambling node. If a rambling node later has a processing resource that is executing a task from the originally owned scheduling collection 40, then the rambling node again becomes the owner of the originally owned scheduling collection 40.

Figure 5B:
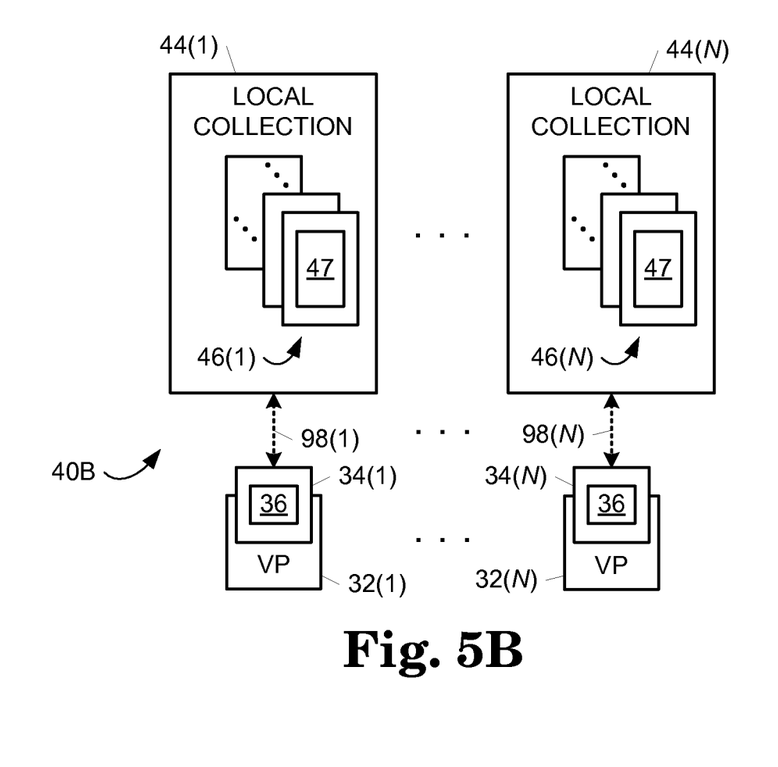

FIGS. 5A-5B are block diagrams illustrating respective embodiments 40A and 40B of scheduling collections 40.

FIG. 5A is a block diagram illustrating embodiment 40A of scheduling collection 40 which includes a set of schedule groups 90(1)-90(P), where P is an integer greater than or equal to one and denotes the Pth schedule group 90. The set of schedule groups 90(1)-90(P) is arranged in a scheduling ring as indicated by an arrow 96. Each schedule group 90 includes a runnables collection 92, a work queue 93, and a set of zero or more workstealing queues 94. Each runnables collection 92 contains a list of runnable tasks or execution contexts. Scheduler 22 adds an execution context to runnables collection 92 when an execution context becomes unblocked or a new runnable execution context (possibly demand created) is presented to scheduler 22 by process 12. Work queue 93 contains a list of workstealing queues 94 as indicated by an arrow 95 and tracks the execution contexts that are executing tasks from the workstealing queues 93. Each workstealing queue 94 includes one or more unrealized tasks with no assigned execution context.

Scheduler 22 populates scheduling collections 40A (FIG. 1) with respective sets of zero or more schedule groups 90 at any time (e.g., in response to executing other tasks) where each schedule group 90 includes a set of tasks of process 12. In such embodiments, scheduler 22 may search each schedule group 90 in a scheduling collection 40A before searching for a task in another scheduling collection 40 or 40A.

Scheduler 22 may attempt to locate a task to execute in the schedule group 90 from which an available virtual processor 32 most recently obtained an executable task or in the schedule group 90 indicated by an index 97 (e.g., a round-robin index). In each schedule group 90, scheduler 22 may search for realized tasks in the runnables collection 92 of the schedule group 90 before searching for a realized task in other schedule groups 90 (e.g., in a round robin order). If no realized task is found, then scheduler 22 may search for unrealized tasks in the workstealing queues 94 of the schedule group 90 before searching for an unrealized task in other schedule groups 90 (e.g., in a round robin order). Scheduler 22 may update the index 97 to identify a schedule group 90 where an executable task was found.

Process 12 may use schedule groups 90 in scheduler 22 to provide a structure for locality of work, fairness, and forward progress. The tasks of each schedule group 90 may be grouped due to logically related work (e.g., a collection of tasks descending from a common root task), hardware topology (e.g., a non-uniform memory architecture (NUMA)), or a combination thereof.

FIG. 5B is a block diagram illustrating embodiment 40B of a scheduling collection 40 which includes local collections of tasks 44(1)-44(N) corresponding to respective virtual processor 32(1)-32(N).

In embodiments where one or more scheduling collections 40 which include local collections 44, the set of execution contexts in scheduler 22 also includes sets of runnable execution contexts 46(1)-46(N) in respective local collections 44(1)-44(N). Each execution context 46 has an associated task 47 that was unblocked by the execution of a task 36 where the task 36 was executed or is currently being executed on the virtual processor 32 corresponding to the local collection 44 that includes the execution context 46.

Scheduler 22 may first attempt to locate a task in the local collection 44 corresponding to the available virtual processor 32 before searching elsewhere in scheduling collection 40B. Local collections 44 may allow scheduler 22 to exploit memory locality and other effects that may occur with hardware threads 16. In executing process 12, scheduler 22 may assign each wait-dependent execution context that becomes unblocked to the local collection 44 corresponding to the virtual processor 32 that caused the execution context to become unblocked. When a virtual processor 32 becomes available, the virtual processor 32 may attempt to execute the most recently added execution context in the corresponding local collection 44 to try to take advantage of data stored in the memory hierarchy corresponding to the virtual processor 32.

If an executable task is not found in the local collection 44 corresponding to the available virtual processor 32, then scheduler 22 may attempt to locate an executable task in a local collection 44 corresponding to another virtual processor 32 of a scheduling node 30. Scheduler 22 accesses the local collections 44 corresponding to the other virtual processors 32 in a round-robin or other suitable order and may execute the least recently added execution context in the local collection 44 where an executable task is found.

In other embodiments, other scheduling collections 40 may include both the schedule groups 90 of scheduling collection 40A (FIG. 5A) and the local collections 44 of scheduling collection 40B (FIG. 5B).

Figure 6A:
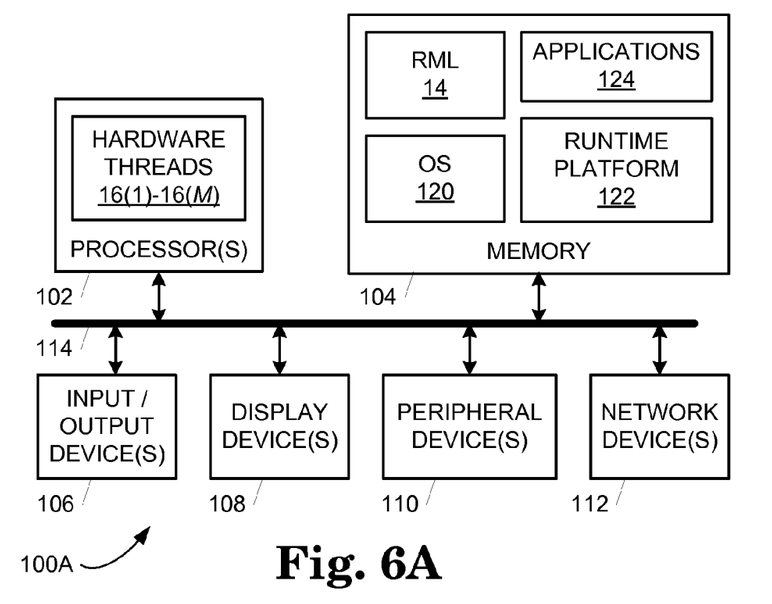
FIGS. 6A-6B are block diagrams illustrating embodiments of a computer system configured to implement a runtime environment including a scheduler with scheduling collections.
Figure 6B:
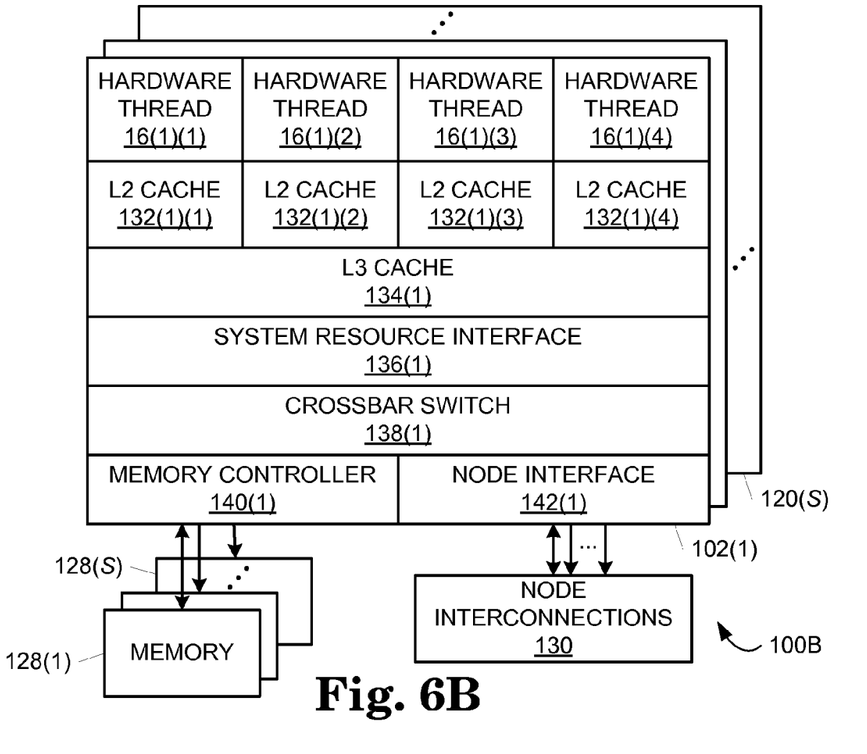

FIGS. 6A-6B are block diagrams illustrating embodiments 100A and 100B, respectively, of a computer system 100 configured to implement runtime environment 10 including scheduler 22 with scheduling collections 40.

As shown in FIG. 6A, computer system 100A includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100A represents any suitable processing device configured for a general purpose or a specific purpose. Examples of computer system 100A include a server, a personal computer, a laptop computer, a tablet computer, a personal digital assistant (PDA), a mobile telephone, and an audio/video device. The components of computer system 100A (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), an operating system (OS) 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100A boots and executes OS 120. OS 120 includes instructions executable by processor packages 102 to manage the components of computer system 100A and provide a set of functions that allow applications 124 to access and use the components. In one embodiment, OS 120 is the Windows operating system. In other embodiments, OS 120 is another operating system suitable for use with computer system 100A.

Resource management layer 14 includes instructions that are executable in conjunction with OS 120 to allocate resources of computer system 100A including hardware threads 16 as described above with reference to FIG. 1. Resource management layer 14 may be included in computer system 100A as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100A as part of an application 124, as a library of functions available to one or more applications 124, or as an integrated part of OS 120 and/or resource management layer 14.

Each application 124 includes instructions that are executable in conjunction with OS 120, resource management layer 14, and/or runtime platform 122 to cause desired operations to be performed by computer system 100A. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100A and output instructions or data from computer system 100A to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100A. Examples of display devices 108 include a monitor, a display screen, and a projector.

Peripheral devices 110 include any suitable type, number, and configuration of peripheral devices configured to operate with one or more other components in computer system 100A to perform general or specific processing functions.

Network devices 112 include any suitable type, number, and configuration of network devices configured to allow computer system 100A to communicate across one or more networks (not shown). Network devices 112 may operate according to any suitable networking protocol and/or configuration to allow information to be transmitted by computer system 100A to a network or received by computer system 100A from a network.

FIG. 6B is a block diagram illustrating embodiment 100B of computer system 100. Computer system 100B also includes at least processor packages 102 and memory system 104. Processor packages 102 include processor packages 102(1)-102(R) and memory system 104 includes sets of memory devices 128(1)-128(R) where R is an integer than is greater than or equal to two and represents the Rth processor package 102 and Rth set of memory devices 128. OS 120, runtime platform 122, applications 124, and resource management layer 14 may each be stored in any suitable ones of memory devices 104(1)-104(R).

In the embodiment of FIG. 6B, each processor package 102(1)-102(R) and respective set of memory devices 128(1)-128(R) form a node. The nodes are interconnected with any suitable type, number, and/or combination of node interconnections 130. The speed and/or bandwidth of interconnections 130 may vary between the nodes.

Each processor package 102 includes a set of hardware threads 16(1)-16(4) where each hardware thread includes an L1 (level one) cache (not shown). Each processor package 102 also includes a set of L2 (level two) caches 132(1)-132(4)

that correspond to respective hardware threads 16(1)(1)-16(1)(4). Each processor package 102 further includes an L3 (level three) cache available to the set of hardware threads 16(1)-16(4), a system resource interface 136, a crossbar switch 138, a memory controller 140, and a node interface 142. System resource interface 136 provides access to node resources (not shown). Crossbar switch 138 interconnects system resource interface 136 with memory controller 140 and node interface 142. Memory controller 140 connects to a memory device 128. Node interface 142 connects to one or more node interconnections 130.

Because a node includes local memory (i.e., a set of memory devices 104), the access to the local memory by processor packages 102 in the node may be faster than access to memory in other nodes. In addition, access to memory in other nodes may depend on a connection speed, bandwidth, cache topology, and/or NUMA node distance of interconnections 130 between the nodes. For example, some nodes may be connected with a relatively fast interconnection 130 such as an Advanced Micro Devices HyperTransport bus or an Intel CSI bus while others may be connected with one or more relatively slow interconnections 130.

In other embodiments, each processor package 102 may include other configurations and/or numbers of caches. For example, each hardware thread 16 may include two or more L1 caches in other embodiments and the L2 and/or L3 caches may or may not be shared in other embodiments. As another example, other embodiments may include additional caches (e.g., a level four (L4) cache) or fewer or no caches.

With reference to the embodiments described above in FIGS. 1-5B, the memory and interconnect latencies in computer system 100B provide node distances that may be considered by runtime environment 10, resources management layer 14, and/or scheduler 22 in forming scheduling nodes 30. For example, runtime environment 10, resources management layer 14, and/or scheduler 22 may create a scheduling node 30 for each node in computer system 100B along with a corresponding scheduling collection 40. Runtime environment 10, resources management layer 14, and/or scheduler 22 may map the scheduling collections 40 into a partial or full search order based on the interconnect topology between the nodes. For example, any two nodes connected with a relatively fast interconnection 130 may be grouped into the same scheduling node and scheduling collection subset level and nodes with relatively slow interconnections 130 may be grouped into a scheduling node and scheduling collection subset level above the scheduling node and scheduling collection subset level that includes the relatively fast interconnection 130.

By searching the scheduling collections 40 for executable tasks in the search order, processing resources in nodes increase the likelihood of exploiting memory locality effects in computer system 100B. Tasks from the same scheduling collection 40 may be more likely to have common data that is present in the local memory hierarchy of a node than tasks from another scheduling collection 40.

In addition to the potential locality advantages, the use of scheduling nodes and scheduling collections in the above embodiments may provide a scheduler with the ability to reduce contention between processing resources that are searching for tasks to execute. Processing resources in different scheduling nodes initiate the search for executable tasks in different corresponding scheduling collections. By doing so, the number of locks or other synchronization constructs placed on task collections in the scheduler may be reduced.

The scheduler may also scale to computer systems with a large number of processing resources as a result of the localized search for executable tasks. Further, the scheduler may provide locality of work while preserving fairness and forward progress using round-robin searching and workstealing queues in schedule groups.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a scheduler in a process of a computer system, the method comprising:
   in response to one of a first plurality of processing resources in a first scheduling node becoming available, searching for a first task to execute in a first scheduling collection corresponding to the first scheduling node; and
   in response to finding no first task to execute in the first schedule collection, executing, with the one of the first plurality of processing resources, a second task from a second scheduling collection corresponding to a second scheduling node that includes a second plurality of processing resources, the first and second scheduling nodes identified for the scheduler based on one or more execution metrics for respective sets of components of the computer system, the first and the second scheduling collections are mapped into at least a partial search order by comparing execution costs between at least the first and the second scheduling nodes.

2. The method of claim 1 further comprising:
   in response to finding the first task in the first scheduling collection, executing the first task with the one of the first plurality of processing resources.

3. The method of claim 1 further comprising:
   searching a first set of schedule groups for the first task in the first scheduling collection.

4. The method of claim 3 further comprising:
   searching a second set of schedule groups for the second task in the second scheduling collection.

5. The method of claim 1 wherein the one of the first plurality of processing resources includes a first virtual processor and a first hardware thread.

6. The method of claim 1 further comprising:
   in response to finding no first task to execute in the first schedule collection, searching for the second task in the second scheduling collection based on at least one execution metric that relates the first scheduling node to the second scheduling node.

7. The method of claim 1 further comprising:
   searching for a third task to execute in a local collection corresponding to the one of the first plurality of processing resources; and
   in response to finding the third task to execute in the local collection, executing the third task with the one of the first plurality of processing resources.

8. The method of claim 1 wherein searching for the first task in the first scheduling collection further comprising:
   searching for a realized task in a set of schedule groups in the first scheduling collection; and
   in response to finding no realized task to execute in the set of schedule groups, searching for an unrealized task in the set of schedule groups.

9. A method comprising:
   identifying first and second scheduling nodes for a scheduler in a process executing on a computer system based on one or more execution metrics for respective sets of components of the computer system, the first and the second scheduling nodes including respective first and second sets of processing resources;
   creating first and second scheduling collections corresponding to the first and the second scheduling nodes, respectively;
   mapping the first and the second scheduling collections into at least a partial search order by comparing execution costs between at least the first and the second scheduling nodes; and
   populating the first and the second scheduling collections with first and second sets of tasks, respectively.

10. The method of claim 9 wherein the partial search order is based on one or more execution metrics associated with the first and the second scheduling nodes.

11. The method of claim 9 comprising:
   allocating, with a resource management layer, the first and the second scheduling nodes with the respective first and second sets of processing resources.

12. The method of claim 11 wherein first and second memories correspond to the first and the second sets of processing resources, wherein access to the first memory by the first set of processing resources is faster than access to the second memory by the first set of processing resources, and wherein access to the second memory by the second set of processing resources is faster than access to the first memory by the second set of processing resources.

13. A computer readable memory storing computer-executable instructions that, when executed by a computer system, perform a method comprising:
   creating, in a process executing on the computer system, a scheduler with at least first and second scheduling collections corresponding to respective first and second scheduling nodes identified based on one or more execution metrics for respective sets of components of the computer system, the first and the second scheduling nodes including respective first and second pluralities of processing resources;
   mapping the first and the second scheduling collections into at least a partial search order by comparing execution costs between at least the first and the second scheduling nodes;
   executing a first realized task from the first scheduling collection with one of the first plurality of processing resources in response to the first realized task being found in the first scheduling collection; and
   executing a second realized task from the second scheduling collection with the one of the first plurality of processing resources in response to the first realized task not being found in the first scheduling collection.

14. The computer readable memory of claim 13, the method further comprising:
   searching a first plurality of schedule groups in the first scheduling collection to determine whether the first realized task is found in the first scheduling collection.

15. The computer readable memory of claim 14, the method further comprising:
   searching a second plurality of schedule groups in the second scheduling collection to determine whether the second realized task is present in the second scheduling collection.

16. The computer readable memory of claim 13, the method further comprising:
   executing a first unrealized task from the second scheduling collection with the one of the first plurality of processing resource in response to the first realized task not being found in the first scheduling collection and the second realized task not being found in the second scheduling collection.

17. The computer readable memory of claim 13, the method further comprising:
   identifying the first and the second scheduling nodes based on the one or more execution metrics.

18. The computer readable memory of claim 17 wherein the one or more execution metrics includes a non-uniform memory access (NUMA) distance.

* * * * *